United States Patent [19]
Corbitt

[11] Patent Number: 5,301,460
[45] Date of Patent: Apr. 12, 1994

[54] MULCH PRODUCT

[76] Inventor: H. C. Corbitt, Rte. 4, Box 76, Jasper, Fla. 32052

[21] Appl. No.: 684,242

[22] Filed: Apr. 12, 1991

[51] Int. Cl.$^5$ .............................................. A01G 7/00
[52] U.S. Cl. ............................................ 47/9; 241/73
[58] Field of Search .................... 47/9; 241/68, 69, 73

[56] References Cited

U.S. PATENT DOCUMENTS

| | | | |
|---|---|---|---|
| 2,092,100 | 9/1937 | Waynick | 47/9 |
| 3,210,174 | 10/1965 | Harshman | 47/9 |
| 3,645,714 | 2/1972 | Heming et al. | 71/24 |
| 3,976,495 | 8/1976 | Buckman et al. | 106/18.34 |
| 4,154,174 | 5/1979 | Rees, Jr. et al. | 47/DIG. 10 |
| 4,250,662 | 2/1981 | Rees, Jr. et al. | 47/9 |
| 4,253,273 | 3/1981 | Rees, Jr. et al. | 47/DIG. 10 |
| 4,433,813 | 2/1984 | Whatton et al. | 241/73 |
| 4,932,156 | 6/1990 | Underwood | 47/9 |

Primary Examiner—Carl D. Friedman
Assistant Examiner—Christopher Kent
Attorney, Agent, or Firm—Longacre & White

[57] ABSTRACT

A mulch product and method of making same wherein the resultant mulch product includes a shredded fine portion, a bulky portion, and a stringy binding portion. When water soaks through the distributed mulch product, a relatively impervious mat is formed which is resistant to ordinary environmental effects. The mulch is preferable manufactured from an insect and rot resistant wood. The mulch product is manufactured using a swinging hammer type of wood hog using a surrounding screen having a plurality of holes of not less than approximately 2 inches across.

5 Claims, 4 Drawing Sheets

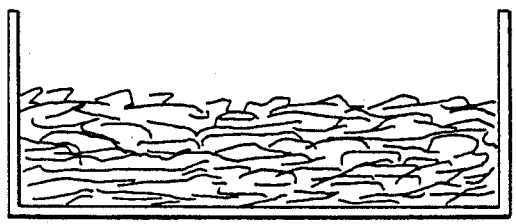
FIG. 5a
FIG. 5b
PRIOR ART
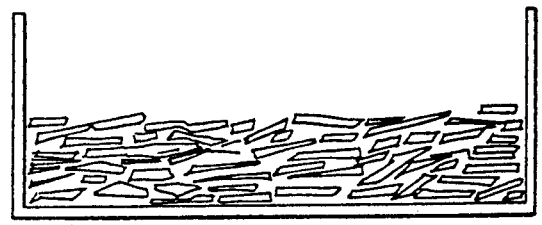
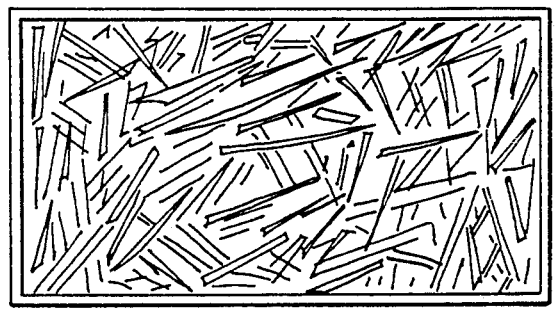
FIG. 6a
FIG. 6b
PRIOR ART
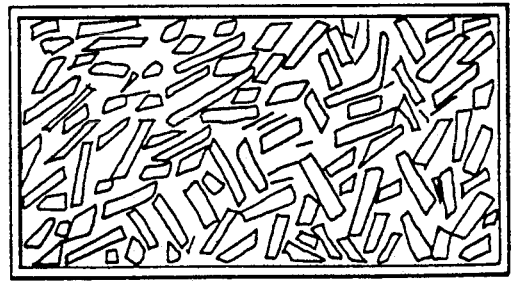

MULCH PRODUCT

BACKGROUND OF THE INVENTION

A) Field of the Invention

This invention relates to the field of mulch manufacturing generally. More particularly, this invention relates to the field of manufacturing a mulch product having particular gradation characteristics from a naturally insect and rot resistant wood. The resulting mulch product is made of generally a coarsely divided portion, a finely divided portion, and a stringy binding portion.

B) Description of the Prior Art

Mulch products are widely known and used in the landscaping industry. The mulch products which have been developed over the years can generally be divided according to the methods used in the manufacturing process and the resulting product.

With respect to methods of manufacturing, there exists at least three known methods of manufacturing for which machinery is generally available. The first of these methods is the fixed hammer (or punch and die) method for creating a divided wood product. This method consists of loading a mulch machine from either the top or side so as to pace wood product against a spinning hammer. The spinning hammer forces the loaded wood product against a screen by the series of fixed position rotating hammers. As the product is forced between the spinning hammer and screen and ultimately through the screen, the wood product naturally divides according to the size hole through which the product is passed. The hole sizes in the screens vary, but can be in the range of 1-2 inches.

This method results in a relatively uniform chip product having little or no pulverized portion. The reason behind the lack of pulverization lies in the fact that the hammers which are rotated against the loaded wood product are fixedly attached in a relatively unmoving position to a rotating shaft. The hammers are rotated a predetermined distance from a surrounding screen and loaded wood product is forced into the space between the rotating hammers and surrounding screen. As such, with each sweep of the hammers, loaded wood product is pushed through the screen and forced to divide into smaller pieces. The spinning fixed hammers rapidly make successive sweeps and pass chips out with each sweep.

This method of mulch manufacture requires a powerful rotational force for the fixed hammers to consistently force wood product between the hammers and screen. If the power source is insufficient, the rotating hammers will jam as wood product wedges between the screens and hammers. Also, the associated supporting equipment for the screens and the hammers must be fairly resistant to deformation, i.e., heavy gage metal. If the hammers and screens are able to displace one with respect to the other, the machine is subject to repeated jamming.

A second known method of manufacturing mulch is to use an apparatus similar to the apparatus used for the fixed hammer system, with the exception that the hammers are rotatably affixed to the rotating shaft, i.e., with each stroke the hammers swing outwardly from the mounting shaft. In this manner, as the hammer swings, centrifugal action displaces the hammer head towards the surrounding screen. In the event the hammer is unable to displace loaded wood through the screen during a particular stroke, the hammer rotates backwardly with respect to the rotation of the supporting shaft to clear the wood product and leave it in place against the screen. In this manner, a piece of wood product between the screen and hammers is successively pulverized by the swinging hammers until the product is sufficiently divided to pass through the surrounding screens.

Owing to the pulverization and splintering process which the wood product is subject to in the swinging hammer process, a much more divided and shattered mulch product is created. The holes in the surrounding screens through which pulverized wood product pass has been in the range of 1-2 inches in prior art swinging hammer mulch machines. The resulting prior art mulch product is regularly sized and is finely divided into filaments of varying length.

A third method of creating a mulch product is by chipping. This method is commonly used for tree and shrub trimming disposal wherein a length of wood product is fed directly against a rapidly spinning chipping wheel. The spinning wheel simultaneously draws the length of wood onto the grinding surface and shears wood chips off the wood. A uniformly sized and generally non-pulverized mulch product is formed.

The foregoing products exhibit problems when used for mulching purposes. Since a mulch product is intended to provide ground cover between shrubs and other garden plants to retain moisture and smother weeds, it is helpful if the mulch stays in place after application, i.e., is resistant to being carried off by rain, strong wind, and other environmental effects. The first and thirdly described mulch products of uniformly sized and graded product is particularly susceptible to being removed. The larger sized particle chips simply float away. Owing to the fact that wood is generally less dense than water, particularly after the wood has been divided, the regularly sized chipped wood product is well suited to be lifted by flowing water currents and being carried until the water loses the necessary energy to move the mulch. Needless-to-say, mulch is not useful when it is carried to positions other than intended, and can further cause clogging of drainage ways, grates, etc. throughout the garden.

Similarly, when rain strikes the secondly described finely divided wood product (made by the swinging hammer method), the force of the falling water can displace the filaments away from their original position simply by the force of impact of the water against the distributed mulch. Although the finely divided product will eventually absorb enough water to stay in place, the time required for this to occur is too long for such methods to be effective against a 30-40 minute rain storm. As such, the product is washed away just as is the chip product.

In view of the foregoing problems associated with known mulch products, the present invention is directed to a method and resultant mulch product which is not easily removed by exposure to ordinary environmental factors. Specifically, the present product is a mulch including a finely divided portion, a course portion, and a stringy binding portion. This unique blend of sizing of shredded, splintered, shattered, and divided wood product is created by a novel mulch production method.

SUMMARY OF THE INVENTION

The present mulch product is a combination mulch product including approximately 25%–50% of a finely divided and pulverized filament portion. This portion of the product has a large surface area and is used for soaking up fluid passing through the product. Owing to the finely divided filament shapes with resultant large surface area, the product readily soaks up passing fluid and rapidly sinks in a fluid stream. The remaining portions of the present mulch product comprise firstly a larger splintered and shattered element up to several inches in length and an inch or so around or across comprising approximately 40%–70% of the total mulch product. The final 5%–10% of the product comprises a stringy binding portion up to several inches in length. This stringy binding portion serves to overlay the other portions of the mulch product and form a net like structure after a soaking rain.

In use, the finely divided portion of the present mulch product soaks up passing fluid so as to sink in the fluid stream quite rapidly. The larger shattered portions also soak up passing fluid, owing to their shattered condition, but sink rather more slowly on top of the finely divided elements. Finally, the stringy binding element settles over and in between the larger shattered portions. As a result, the combination mulch forms a weather resistant mat which is relatively impervious to ordinary environmental effects.

The mulch product according to the present invention stays in place and performs the functions of ground cover, weed preventer, moisture retainer, etc. that mulch is supposed to accomplish.

In a further embodiment of the invention, the mulch can be manufactured from naturally pest and rot resistant woods such as Cypress cedar, red wood, etc., or can be made from more available woods which have been chemically treated so as to resist rot and pests. The resulting mulch product then not only provides good ground cover, but also provides termite deterrent, and is resistant to rotting processes which can rob the underlying soil of necessary nitrogen.

The method of making the present mulch product is a further development of the known swinging hammer pulverization and chip making process. A swinging hammer mulch hog is continuously fed solid wood product, i.e., whole logs or wood waste by-products from lumber processing. The machine is equipped with a dividing screen having holes of not less than approximately 2 inches in diameter. In this manner, a finely divided product is manufactured including a significant portion which is of a larger size in length and overall shape, including a stringy binding portion. This process creates the unique combination of filament shapes and sizes which provide a comparatively unwashable mat when exposed to weathering.

The process includes the steps of loading a swing hammer type wood hog with the desired source wood product, processing the selected wood product through the swinging hammer wood divider through screens having holes of 2 inches or greater diameter, and conveying the processed mulch product to a storage and/or loading site for further distribution.

The following is a detailed description of the preferred embodiment of the present invention including drawings and claims which form a part thereof.

BRIEF DESCRIPTION OF THE DRAWINGS

FIG. 5a is an elevational view of mulch product according to the present invention.

FIG. 5b is an elevational view of prior art mulch.

FIG. 6a is a top plan view of mulch product according to the present invention.

FIG. 6b is a top plan view of prior art mulch.

DETAILED DESCRIPTION OF THE PREFERRED EMBODIMENT

Figure 2:
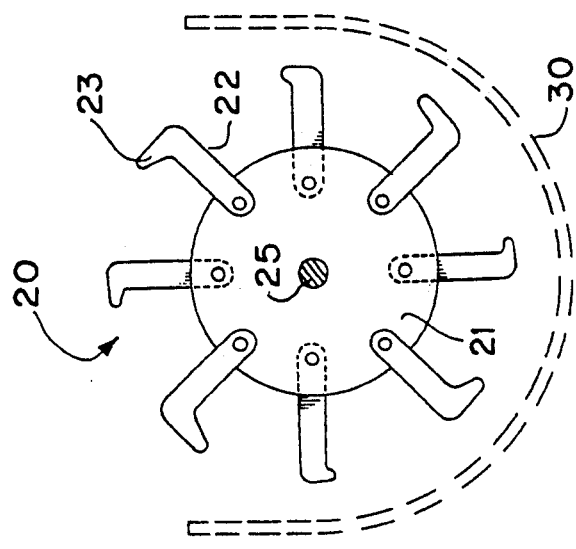
FIG. 2 is an end view of the swinging hammer wood hog portion of the machine shown in FIG. 1.
Figure 1:
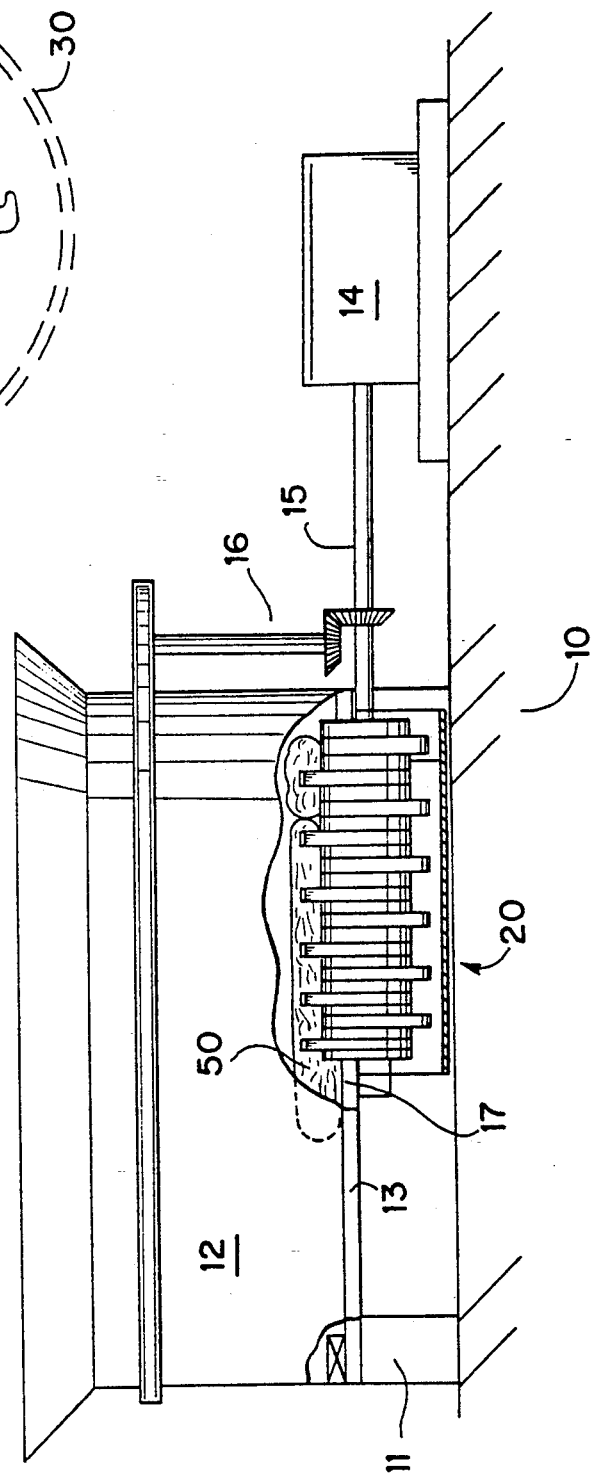
FIG. 1 is a partial section elevational view of a swinging hammer wood hog machine used in the present method.
Figure 3:
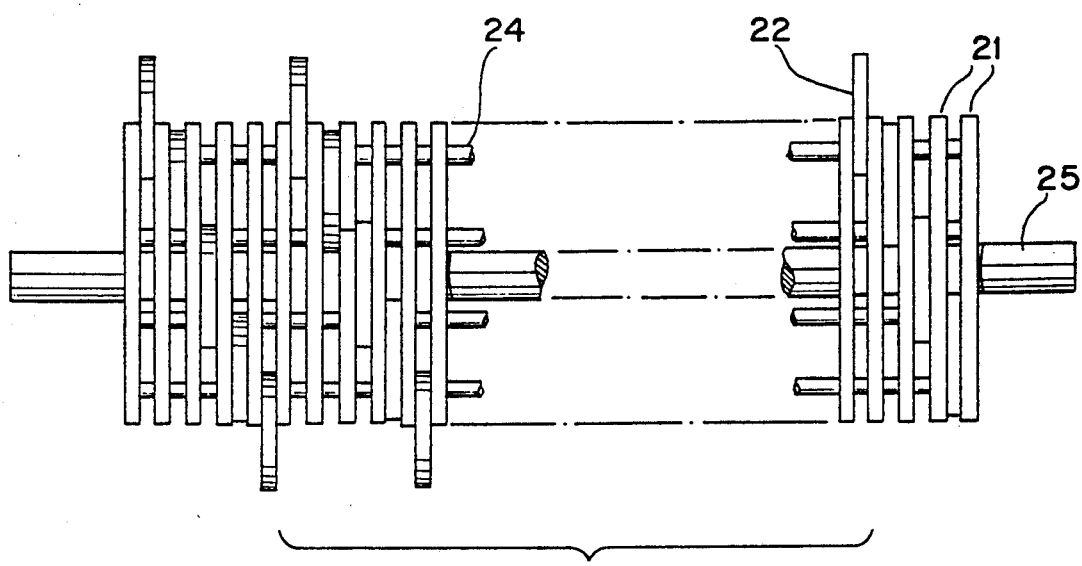
FIG. 3 is an elevational view of the wood hog portion of the machine shown in FIG. 2.
Figure 4:
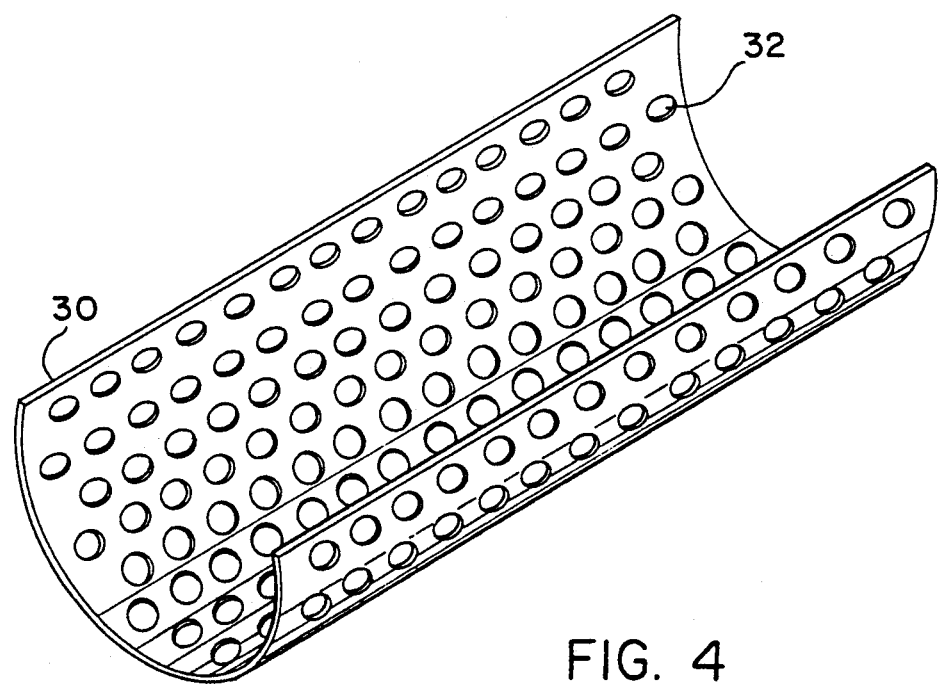
FIG. 4 is a perspective view of a screen used in the swinging hammer wood hog machine used in the present method.

The machine 10 for accomplishing the present method and creating the present mulch product is shown in FIG. 1. The machine 10 includes a loading barrel 12 mounted for axial rotation on a support frame 11. The barrel rotates on rollers (not shown) above a fixed floor plate 13. The floor plate 13 includes a slot 17 therein for accommodating a swinging hammer wood hog 20. The wood hog 20 is connected to and driven by driveshaft 15 which is in turn driven by a source of rotational motion 14, i.e., a large displacement I.C. engine. The driveshaft 15 also drives a power takeoff transmission 16 for rotatably driving the loading barrel 12 on the support frame 11.

The loading barrel 12, support frame 11, and associated driving system 15, 16 is preferably made of steel or other similarly resilient material. Although the particular thickness of the steel is subject to particular use requirements, a thickness of at least ¼ to ½ inch is desireable.

Wood is loaded into barrel 12 which can have a diameter as large as necessary to accommodate the wood product 50 selected to create the mulch product. If a comparatively small wood waste product is being used, i.e., waste trimmings from other wood product preparation. the diameter of barrel 12 may be sized to suit, i.e., 3-5 feet. If the wood product comprises lengths of logs, the diameter may be 12 feet or more according to the size of the logs. In this manner, the barrel may be loaded with a front end loader or similarly sized mechanized machine which can load wood scraps at a rapid pace.

Barrel 12 may include fins or laterally inwardly directed spikes (not shown) to engage the loaded wood product and drive it over slot 17 in floor plate 13. In this manner, wood product is continuously made available to the wood hog 20.

The wood hog 20 is a swinging hammer type hog wherein hammers 22 are located on swivel mounts 24 around the periphery of hammer plates 21. Successive hammer plates 21 are fixedly attached along a support shaft 25. The entire wood hog 20 assembly is rotatably supported and shaft is rotatably driven by driveshaft 15. Wood product which is loaded into barrel 12 and urged over slot 17 is drawn downwardly through slot 17 and into the wood hog 20 by the motion of the swinging hammers.

The wood hog 20 is surrounded by a screen member 30 including a series of randomly or regularly sized holes 32 therein. The holes are preferably sized to be not less than 2 inches in diameter and are evenly distributed along the length and breadth of the screen.

The screen 30 and wood hog 20 are also made from steel. Again, the particular dimensions of the several pieces which make up the swinging hammers and screen are subject to particular design considerations, but should be sized to resist considerable fatigue and heat. The screens can be made from steel plate of not less than ¼ to ½ inch in thickness. The swinging hammer portion of the mulch machine includes a support shaft 25 with several hammer mounting plates 21 mounted therealong. The hammer plates 21 are comprised of heavy gage steel and are welded to for rotation with shaft 25. In between the hammer plates are connected a plurality of swivel mounts 24 for the swinging hammers 22. The swivel mounts 24 comprise short lengths of high strength rod or pipe. Hammers 22 are mounted for rotation about swivel mounts 24, and include hammer heads 23 on the end of each hammer. The hammer heads 23 each comprise hardened end portions attached to hammer 22. In this manner, the hammer can be comprised of generally milder steel with the head being hardened for a longer service life.

The mulch product can be manufactured from any wood, but is preferably made from a naturally insect and rot resistant wood such as cypress or cedar. Alternatively, chemically treated ordinary wood, i.e., pine, can be also be used with similar rot and insect resistance.

The resulting mulch product comprises a bulky shattered portion, a finely divided filament portion, and a stringy binding portion. A breakdown of the mulch according to the present invention is shown in comparison to prior art mulch products in the following chart where P.I.=Present Invention, P&D=Punch and Die (Prior Art), S&H=Swinging Hammer (Prior Art), and W.C.=Wood Chip (Prior Art).

| Mulch Portion | P.I. | P&D | S&H | W.C. |
| --- | --- | --- | --- | --- |
| Shredded fines | 25-50% | 5-20% | 40-70% | 0-5% |
| Bulky Shattered | 40-70% | 0-10% | 30-60% | 0-5% |
| Stringy Binder | 5-10% | 0% | 0% | 0% |
| Chipped small | 0% | 25-40% | 0% | 30-50% |
| Course Bulky | 0% | 40-60% | 0% | 50-70% |
| Long Chips | 0% | 5-10% | 0% | 5-10% |

Figure 7:
FIG. 7 is a plan view of shredded single filament wood elements having a length of between 0.1 and 6 cm. according to the present invention.
Figure 8:
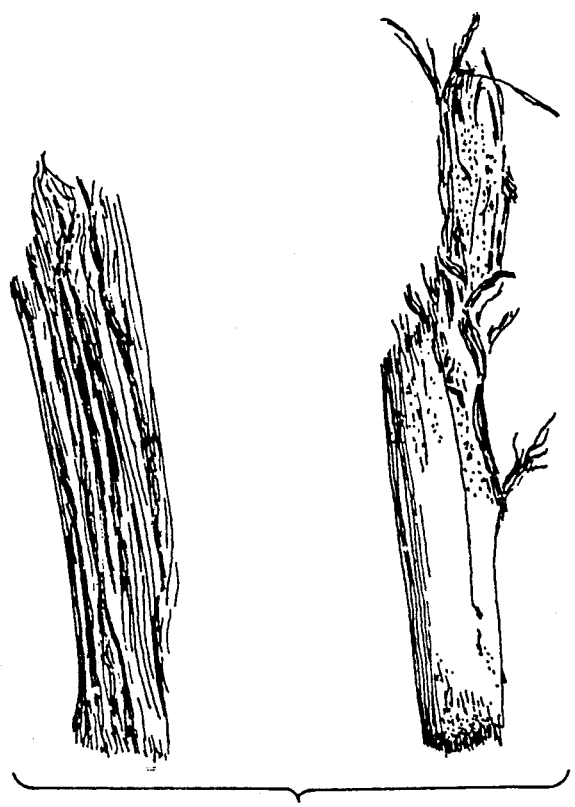
FIG. 8 is a plan view of shattered bulky multi filament wood elements having a length of between 1 and 8 cm. and a cross sectional dimension of between 0.3 and 2 cm. according to the present invention.
Figure 9:
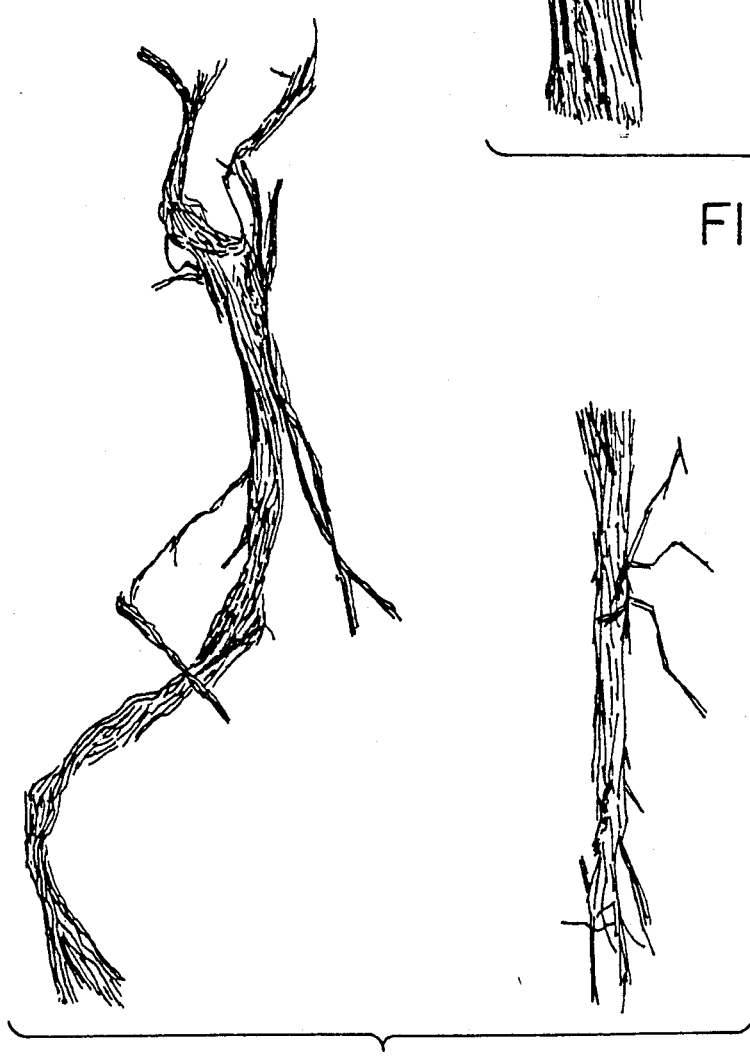
FIG. 9 is a plan view of stringy binding multi filament wood elements having a length of between 5 and 20 cm according to the present invention.

Shredded fines is considered to be essentially single filament shredded wood elements of 0-6 cm. in length (see FIG. 7). Bulky shattered portion is considered to be multi filament shattered wood elements being 1-8 cm. in length with cross sections measuring 0.3-2 cm. and completely irregular shape (See FIG. 8). Stringy binder is considered multi filament wood elements with lengths from 5-20 cm (See FIG. 9). Chipped small wood elements are considered regularly shaped chipped unshattered wood having dimensions 0-1 cm. Course bulky wood elements are considered regularly shaped unshattered wood having dimensions of 1-4 cm. Long chips are multi filament wood elements unshattered and having lengths which exceed 4 cm.

FIG. 5b and 6b shows prior art wood chip or punch and die mulch product having few fines and regularly shaped bulky elements therein. The mulch has considerable space between adjacent elements of the product. This structure enables water and wind to undermine the distributed product and remove it from where the product was originally placed. In contrast, the mulch according to the present invention has a good distribution of sizes so as to fill the interstitial spaces between adjacent wood elements and to prevent ready access by wind and water. This is particularly the case after water has soaked through the mulch and the fines have sunk to underlying positions in the structure and the stringy binder remains on top to form the mulch into a mat. In this manner, a relatively impervious mat is formed which smothers weeds and retains moisture.

While the foregoing is a description of the preferred embodiment of the present invention, the scope of the invention is not to limited except by referral to the appended claims which form a part hereof.

I claim:

1. A mulch product made from wood adapted to rapidly absorb water and maintain its position during exposure to water, when the mulch product is in position on an underlying surface, by sinking and binding with adjacent mulch elements to form a comparatively non-erodible mat, said mulch product comprising:
   25-50% shredded single filament wood elements for rapidly absorbing water and filling gaps within the mulch and having a length between approximately 0.1 and 6 cm.;
   40-70% shattered bulky multi filament wood elements for rapidly absorbing water and sinking to form a weighty bulk of the mulch product and having lengths between approximately 1 and 8 cm. and cross sectional dimensions between approximately 0.3 and 2 cm.; and,
   5-10% stringy binding multifilament wood elements for overlying and interweaving within the water absorbing mulch product and binding the mulch product into a mat and having lengths between approximately 5 and 20 cm.

2. A mulch product as in claim 1, wherein: said mulch product is made from naturally insect and rot resistant wood.

3. A mulch product as in claim 2, wherein: said wood is cypress.

4. A mulch product as in claim 2, wherein: said wood is cedar.

5. A mulch product as in claim 1, wherein: said mulch product is made from wood which has been chemically treated to be insect and rot resistant.

* * * * *